Figure 1:
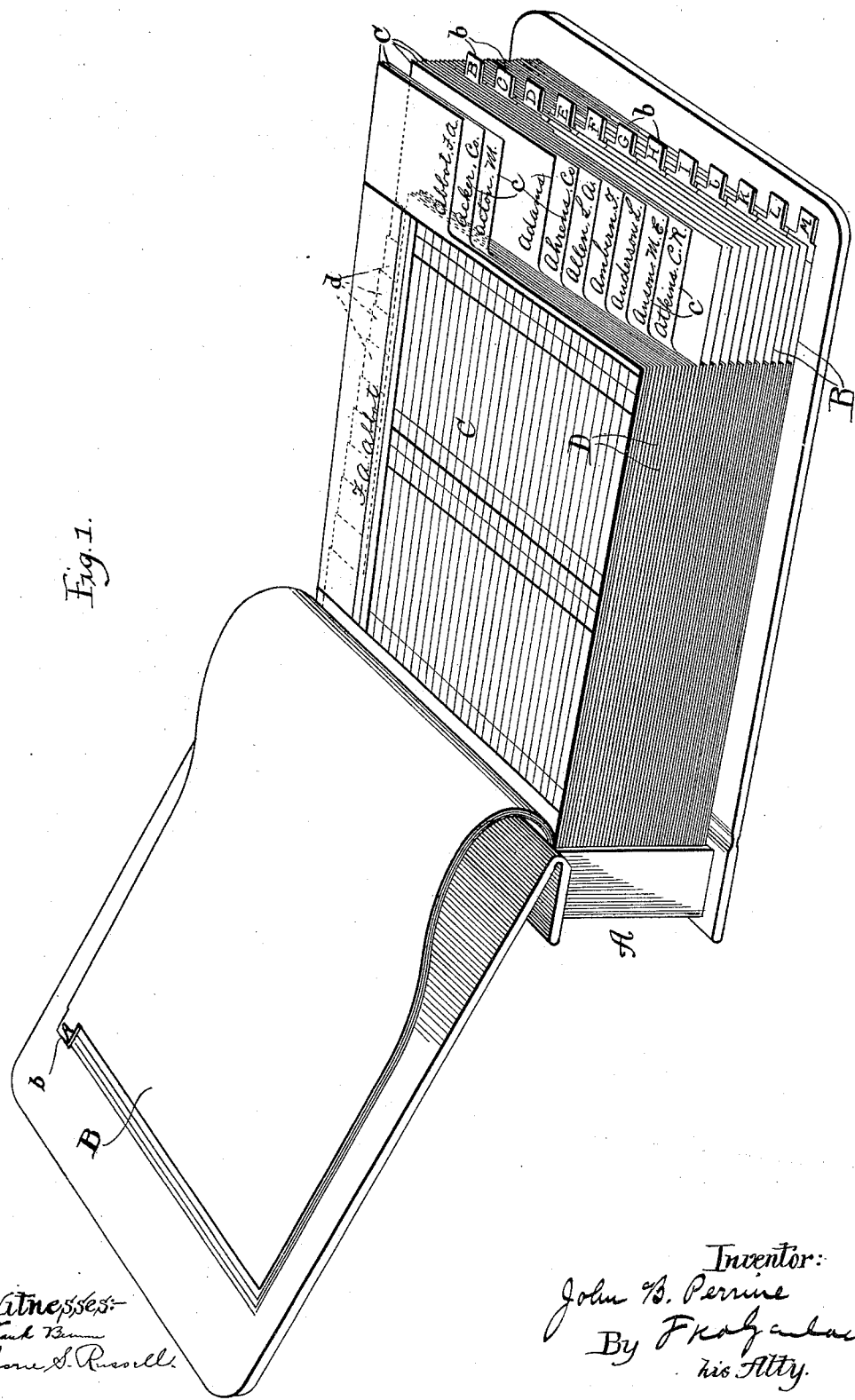

J. B. PERRINE.
SELF INDEXING BOOK.
APPLICATION FILED JUNE 22, 1908.

960,693.

Patented June 7, 1910.
3 SHEETS—SHEET 1.

Witnesses:
Frank Beeren
Leone S. Russell.

Inventor:
John B. Perrine
By F. Katzenbach
his Atty.

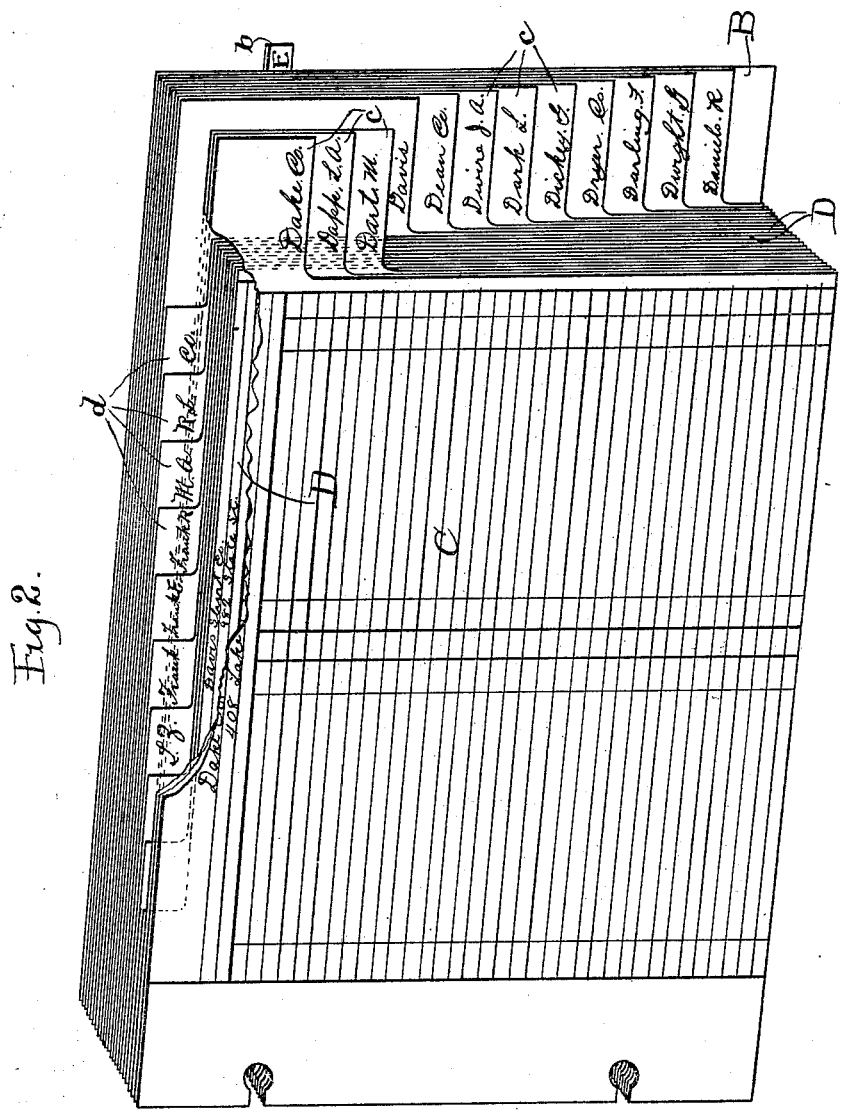

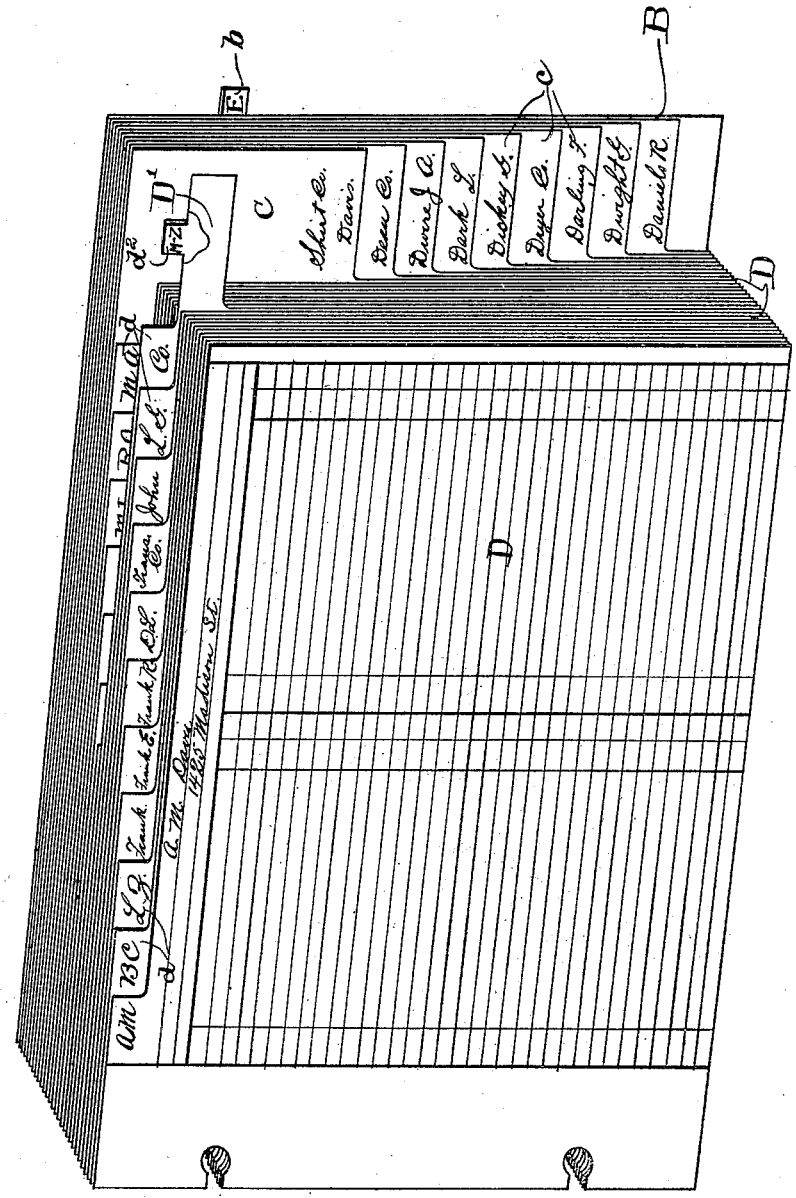

UNITED STATES PATENT OFFICE.

JOHN B. PERRINE, OF VALPARAISO, INDIANA, ASSIGNOR, BY MESNE ASSIGNMENTS, TO WORKMAN MANUFACTURING COMPANY, OF CHICAGO, ILLINOIS, A CORPORATION OF ILLINOIS.

SELF-INDEXING BOOK.

960,693.  Specification of Letters Patent.  Patented June 7, 1910.

Application filed June 22, 1908. Serial No. 439,676.

*To all whom it may concern:*

Be it known that I, JOHN B. PERRINE, a resident of Valparaiso, in the county of Porter and State of Indiana, have invented certain new and useful Improvements in Self-Indexing Books, of which the following is a full, clear, and exact description.

The present invention relates to loose-leaf books or ledgers and more particularly to an improved self-indexing system in which the leaves or accounts may be kept in orderly series and in which they may be divided into divisional and sub-divisional series for convenient access and so that the leaves of any series or sub-series or re-divisional series may be quickly located, the system being one which is capable of almost indefinite division into series and sub-series and which is capable of being indexed progressively.

In Letters Patent No. 880,754, of March 3rd, 1908, there is set forth a self-indexing ledger embodying a series of leaves having marginal portions cut away progressively for indexing a series of leaves and a sub-series having corresponding marginal portions cut away to provide a progressive index for the leaves of the sub-series which are formed to be placed between the leaves of the first series. In the system set forth in said patent the index for a sub-series of leaves is provided at the same margin as the index for the main series, and resultantly the marginal space provided between the shorter marginal index-portions of a single sub-series is sometimes insufficient in height for the space necessary for the marginal index portions of the sub-series between two leaves of the main series.

The present invention aims to remedy this defect by arranging the sub-series of leaves between the leaves of the primary set with progressively excised margins along one of the unexcised edges of the primary sets of leaves, so that there will be practically no limit to the expansion of the system.

The invention also consists in the several other novel features hereinafter set forth and more particularly defined by claim at the conclusion hereof.

In the drawings: Figure 1 is a perspective of a loose-leaf book embodying the invention, being shown open at one of the division leaves between two primary sets of account sheets to expose all of the leaves of one primary set with the index margins thereon. Fig. 2 is a perspective of a primary set of leaves and a sub-series of leaves between two of the leaves of the primary set. Fig. 3 is a similar view illustrating plural sub-series between two of the leaves of a primary set of leaves, some of the latter being omitted.

In the embodiment of the invention illustrated, the leaves of the book are held together in a suitable loose-leaf binder or book A which may be of any known form, the leaves being adapted to be inserted and removed from the binder as desired and so that whenever necessary or desired, additional leaves may be placed in the book. The ledger usually comprises complete leaves B which may serve as transfer records as well as division-sheets between the primary set of leaves C on which the records are kept. The leaves B are each provided with a projecting index marker $b$ progressively arranged, which serve to divide the ledger into alphabetical or other sets as may be desired.

The leaves C are formed by cutting away the marginal portions at the free side of the leaves progressively so that the next underlying leaf of each series will have an exposed portion for the identifying characters or data for each leaf C. For example, if the book is indexed alphabetically as shown in the drawing, the markers $b$ for the several letters of the alphabet are applied to the division-sheets in progressive arrangement as usual in the art. When the book is opened for reference to any one of the leaves containing the accounts under any letter of the alphabet, a portion of each of the leaves C of one of the primary sets between two of the division-sheets B will have portions $c$ progressively exposed at the side-margin for reference to all of the leaves C of that series. On the exposed portions of the leaves of each series respectively the necessary identifying data may be placed.

In order to provide a further sub-index where there are accounts with more than one person with the same surname, I provide an intermediate series of leaves D placed between any two of the leaves C of the primary set desired, the leaves D being excised to leave marginal index-portions $d$ for the sub-index therefor. According to the present invention the indices for the intermediate or sub-series are arranged at one of the margins of the book where the leaves of the primary set are uncut and not at the margin where the index for the primary set of leaves is disposed. Each leaf D of the intermediate series has no marginal portion for the index of the intermediate series of leaves B and is narrower than the leaves C so that the former may be added when desired without concealing any of the underlying marginal index-portions of the leaves C. At the top margin the leaves D are progressively cut away to progressively expose a portion of each leaf D for identifying data or characters. Resultantly, leaves D may be added as desired, to each intermediate series and as they are added to the index will be progressively continued until the entire top-margin has been utilized for the sub-series index.

In some instances there is even insufficient marginal space to index all of the leaves of an intermediate series, and when that occurs the series may be sub-divided into series by interposing a sheet D' beneath the leaves of the intermediate series and providing that leaf with a marker $d^2$ near one of the corners of the leaf, so that this marker will indicate generally that there are additional leaves of the sub-series and when the book is opened at the leaf D' the remaining leaves of the intermediate series, constituted with progressive excised portions the same as the leaves D, the identifying data thereon will be exposed in progressive series the same as already described for the sub-series D.

As many sub-divisions of the intermediate series as desired may be provided when necessary by adding additional markers on an extension of the last or divisional leaf D' between each sub-divisional series of the intermediate series. The markers $d^2$ of each of said leaves D' are disposed so they will all be visible when the index for the first sub-series of an intermediate series is exposed. Thus, by disposing the marginal index-portions of the leaves of a main series at one margin of the sheet and the index-portions of an intermediate series at another margin of the leaves, substantially one entire margin may be utilized for the index of the intermediate series, thus increasing the indexing capacity of the sub-series. Further, when necessary, the intermediate series may be sub-divided into sub-series for each of which substantially one entire margin may be used for an index.

To illustrate the construction, in Fig. 2 the book is shown opened between two of the leaves C of one of the primary sets, which set is listed under the index-letter "D" on a marker $b$ of one of the division sheets B. Several of the accounts under the general index letter "D", and particularly when that name occurs but once in the index of the main series for said letter "D" may be kept on the leaves C of this series. When, however, there are several accounts listed under the same surname, e. g., if there are a number of accounts to be listed under "Davis" a series of intermediate leaves D will be interposed between two of the leaves C of the main series, sufficient in number for all of the accounts to be kept under "Davis". For this intermediate series the leaves D will be inserted, which have progressively increasing excisions so that the account of each "Davis" may be listen or indexed at the top margin of the sheet. If a larger number of leaves is required for all of the "Davis" accounts, than may be indexed across the top margin of the sheet, then in like manner another sub-series of the intermediate series may be used by interposing a sub-division-leaf D' which has its marginal portion extended beyond the index for the intermediate series and there provided with a marker $d^2$ to indicate that some of the "Davis" accounts are to be found in the sub-series of the intermediate series for the "Davis" accounts.

To locate any particular account which is kept on any of the sheets of one of the primary sets, the book may be opened at one of the division-leaves B, whereupon the index at the side-margin for the corresponding series will be exposed and the book may then be opened to any account listed on the index at the side-margin of the leaves. If the account desired is kept on one of the intermediate series, e. g., if the account of "Frank Davis" is desired, the leaves C of the accounts listed in said side-margin before the sheet marked "Davis" of the main series will be turned over, whereupon the intermediate series of sheets D for the "Davis" accounts will have their index-portions $d$ exposed at the upper margin of the book. Then by turning over the overlying leaves D of the intermediate series for the several "Davis" accounts above the sheet marked "Frank" in the top-index, the account of "Frank Davis" will be displayed. If the leaf containing the account desired is located in one of the sub-divisional series of an intermediate series, the book will be opened at the division-leaf D' between the sub-series whereupon the leaves of the desired sub-divisional series of the intermediate series will have their index-portions exposed so any account there listed may be found.

While the invention is shown as specifically embodied in a ledger, the invention may be readily embodied in books for other purposes in which classification and sub-classification of leaves is desired.

The invention is not to be understood as restricted to the details illustrated and described, since these may be modified within the scope of the appended claims without departing from the spirit and scope of the invention.

Having thus described the invention, what I claim as new and desire to secure by Letters Patent, is:

1. In a loose leaf self-indexing book, the combination of a plurality of primary sets of leaves, the leaves of each set having progressively increasing excisions at one margin of the book so that a portion of each of the leaves of one of said sets may be simultaneously exposed for identifying data, identifying markers for distinguishing the primary sets from one another, and a sub-series of leaves interposed between two leaves of one of the primary sets and having progressively increasing excisions at one of the other margins of the book for simultaneously exposing a portion of each of the leaves of the sub-series for identifying data, the leaves of the primary sets being extended to overlie the marginal excisions of the sub-series to conceal the progressively arranged index-portions of the intermediate series of leaves.

2. In a loose-leaf self-indexing book, the combination of a plurality of primary sets of leaves, the leaves of each set having progressively increasing excisions at one margin of the book so that a portion of each of the leaves of a set may be simultaneously exposed for identifying data, a complete divisional leaf between each of the primary sets, progressively exposed projecting markers on the divisional leaves for distinguishing the primary sets of leaves from one another, and a sub-series of leaves interposed between two of the leaves of one of the primary sets and having progressively increasing excisions at one of the other margins of the book for simultaneously exposing a portion of each of the leaves of the sub-series for identifying data, the leaves of the primary sets being extended to overlie the marginal excisions of the sub-series and to conceal the progressively arranged index portions of the intermediate series of leaves.

JOHN B. PERRINE.

Witnesses:
LEONE S. RUSSELL,
FRANK W. BEMEN.